United States Patent [19]

Stockburger et al.

[11] Patent Number: 4,680,807
[45] Date of Patent: * Jul. 14, 1987

[54] METHOD AND DEVICE FOR IDENTIFYING DATA SUPPORTS

[76] Inventors: Hermann Stockburger, Kirnachweg 7, D-7742 St. Georgen; Hans-Georg Winderlich, Niedere Str. 36, D-7730 Villingen, both of Fed. Rep. of Germany

[*] Notice: The portion of the term of this patent subsequent to Jan. 8, 2002 has been disclaimed.

[21] Appl. No.: 774,860

[22] Filed: Sep. 11, 1985

Related U.S. Application Data

[63] Continuation of Ser. No. 592,535, May 14, 1984, abandoned, which is a continuation of Ser. No. 247,165, Mar. 24, 1981, Pat. No. 4,493,107.

[30] Foreign Application Priority Data

Mar. 24, 1980 [DE] Fed. Rep. of Germany ....... 3011317

[51] Int. Cl.⁴ .................................................. G06K 9/00
[52] U.S. Cl. ...................................... 382/58; 235/380; 235/485; 235/486; 340/825.33
[58] Field of Search .................................. 235/380–382, 235/436, 483–490, 468–469, 495, 491–493; 360/131–134; 250/566, 569; 209/534; 382/58; 340/825.31, 825.33

[56] References Cited

U.S. PATENT DOCUMENTS

| | | | |
|---|---|---|---|
| 3,011,152 | 11/1961 | Eckdahl | 235/449 |
| 3,370,157 | 2/1968 | Lockey | 235/483 |
| 3,474,233 | 10/1969 | Hess | 235/453 |
| 3,598,967 | 6/1969 | Berler | 250/569 |
| 3,736,410 | 5/1973 | Ragland et al. | 250/569 |
| 3,761,683 | 9/1973 | Rogers | 235/380 |
| 3,790,754 | 2/1974 | Black et al. | 235/380 |
| 3,850,426 | 11/1974 | Blair | 235/485 |
| 4,013,894 | 3/1977 | Foote et al. | 235/380 |
| 4,087,680 | 5/1978 | Mack et al. | 235/380 |
| 4,138,057 | 2/1979 | Atalla | 235/380 |
| 4,218,674 | 8/1980 | Brosow et al. | 235/380 |
| 4,301,361 | 11/1981 | Lees | 235/483 |

Primary Examiner—Leo H. Boudreau
Attorney, Agent, or Firm—Donald Brown

[57] ABSTRACT

The method of identifying data supports such as credit cards, check cards, identity cards, etc. includes detecting inherent individual features of the cards to derive a random information therefrom. The random information is stored for later comparison with detected information to determine authenticity of the data support. In order to derive the random information in perfectly reproducible manner irrespective of changes of the dimensions of the data support, the individual characterizing features of the data supports are detected within a linear detection zone lying centrally between two opposed lateral edges of the data support. The invention provides an apparatus for perfectly aligning the data supports so that their central lines will always be coincident with the reading path of a detection system in which the data supports are processed.

4 Claims, 5 Drawing Figures

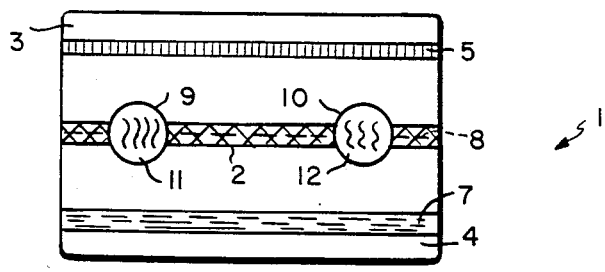
FIG. 1
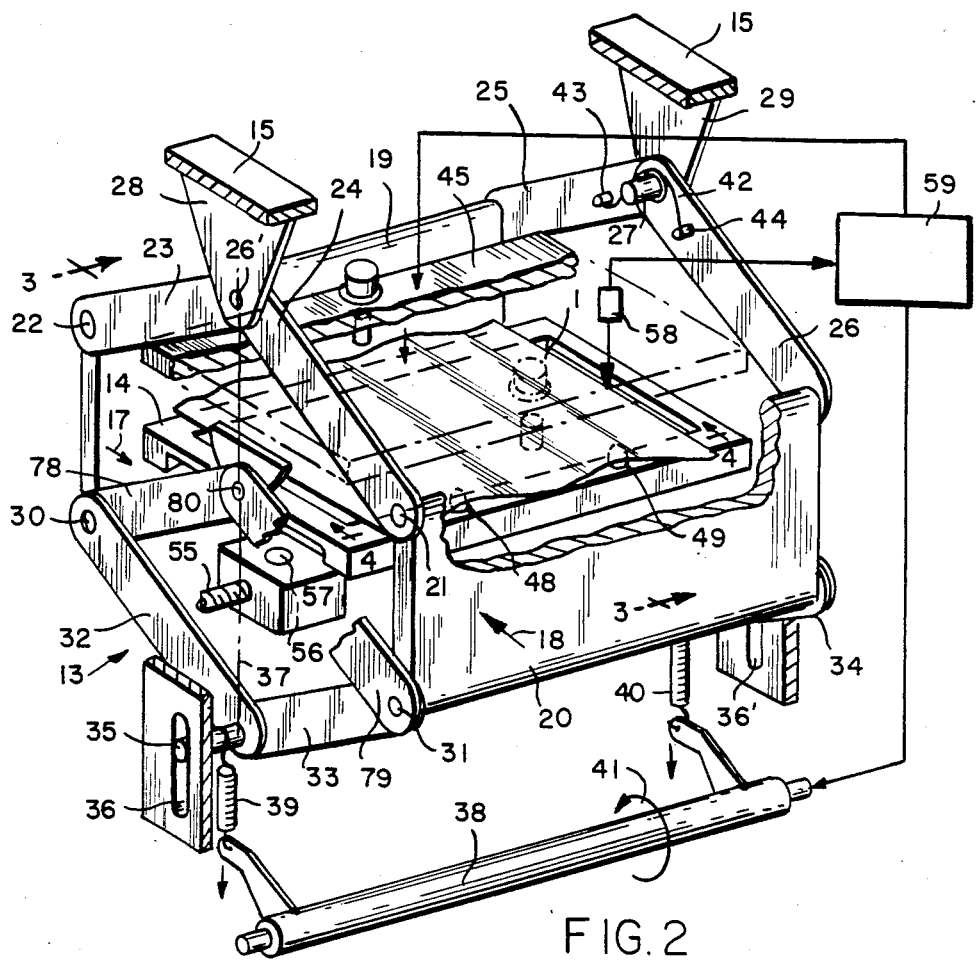
FIG. 2
FIG. 4

METHOD AND DEVICE FOR IDENTIFYING DATA SUPPORTS

This application is a continuation of application Ser. No. 592,535, filed May 14, 1984, now abandoned, which is a continuation of Ser. No. 247,165, filed May 24, 1981, now U.S. Pat. No. 4,493,107.

BACKGROUND OF THE INVENTION

This invention generally relates to data support identifying systems, particularly to an improved method of identifying data supports, a device for performing the method and a data support suitable for use in the method.

It has already been proposed to use characteristic individual features of a data support for deriving a random information, by detecting the characteristic individual features along a linear track on the substrate of the data support. The random information may be generated by detecting the physical properties of the base material of the data support. These physical properties being different from one data support to another, the information detected along a linear track will be different from one data support to another. In order to precisely follow the linear track, lateral abutment or automatic centering systems for centering a magnetic reading head on a magnetic reading track by markings on the data support may be provided.

Upon detection of the physical properties of the individual data support for deriving the corresponding random information, detecting errors may result from an expansion of the data support by humidity or temperature changes, leading to the data support being refused upon determination as to authenticity. This is clearly undesirable.

OBJECTS OF THE INVENTION

It is a primary object of the invention to provide an improved method of identifying data supports by deriving a random identification information from the physical properties of the data support along a precisely defined linear detection zone thereon.

A further object of the invention is to provide a method of identifying data supports such as credit cards, cheque cards, identity papers and similar documents, using a random information derived from the physical properties of the data support along a linear track thereon which is defined and determined in reproducible manner.

A further object of the invention is to provide an apparatus for performing the method and a data support for use in the method and with the apparatus.

SUMMARY OF THE INVENTION

In accordance with the invention, a random information is derived from the individual physical properties of each individual data support along a linear track thereon, and the random information is used for determination of authenticity of the data support. In order to derive the random information from well-defined zones of the data support in reproducible manner and essentially without errors due to deformation or expansion of the card substrate, the physical properties thereof are detected along a detection track lying centrally between two opposed lateral edges of the data support, which, generally, will be in the form of cards or at least flat substrates. Preferably, lateral abutments are provided for automatically aligning the data support so that the detecting system for deriving the random information will always detect a central track on the data support. Even when the overall dimensions of the data support are changed by temperature or humidity effects, the detected linear zone will remain in the center of the data support, and the detected linear track may be much narrower than with conventional methods.

A preferred device for performing the method includes aligning members for aligning the data support with respect to a detection system, these aligning members laterally engaging the data support edges and being movable transversely to the direction of the detection track and symmetrically with respect thereto in reciprocating manner.

In a preferred embodiment, an apparatus for performing the method has a mechanism for deforming the data support into a shape having a non-flat cross-section. This will substantially increase the rigidity of data supports with respect to the engagement of the aligning system, particularly in case of data supports made of flexible material.

DESCRIPTION OF PREFERRED EMBODIMENTS

Further details and objects of the invention will stand out from the following description of exemplary embodiments with reference to the drawings. In the drawings:

FIG. 1 shows a plan view of a data support;

FIG. 2 is a perspective view of one embodiments, in partially broken-away representation;

FIG. 4 is a section along line IV—IV in FIG. 2; and

Figure 3:
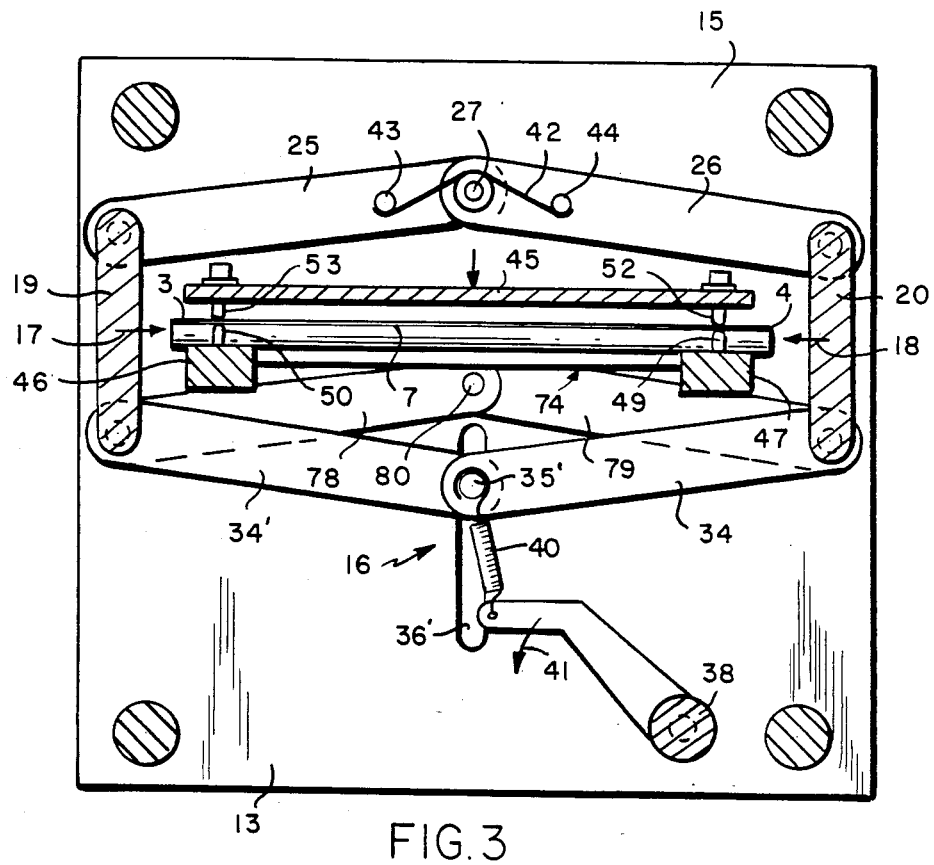
FIG. 3 is a sectional view along line III—III in FIG. 2.

FIG. 1 shows a data support 1 formed as a card, a cheque or identity card for example. In conventional manner, it is provided with an imprint 2, which is only indicated in the central zone of the data support, but it may of course extend over the total surface of the data support. The imprint is formed of a plurality of dashes and lines and/or dots and is preferably made of different colors. The individual color components are applied by separate printing operations. In the upper region of the data support, a magnetic track 5 is provided having clock markings which indicate the positions to be detected on a track.

On the bottom side of the data support, a magnetic protocol track 7 is provided on which characterizing data of positions to be detected within a track are recorded.

As the zone to be detected a linear track 8 is selected lying exactly centrally between the two lateral edges 3 and 4. This extends through the pattern formed by the print 3. It is an imaginary line which is not visible, because no information with respect to the linear track is required in addition to the imprint already present. As the random information, the individual features of printing differences resulting from each imprint or differences of correspondence of plural printing operations performed one above the other for a colored imprint are used. The track 8 may be actually linear so that, within the track, a plurality of discrete values may be detected which are not levelled by the lateral extension of the track. By providing the track 8 exactly centrally between the two lateral edges 3 and 4, the track 8 will always be exactly in the center of the card regardless of an eventual extension or contraction of the card material due to any temperature or humidity changes causing a change of the overall dimensions of the card, so that a detection of the card aligned to the center thereof will allow reading of the discrete values from the track 8 in perfectly reproducible manner. For characterizing the data support, the data read from the track may be delivered to a central storing location in an on-line operation, in addition to any characterizing features eventually imprinted on the data support, or may be recorded on the protocol track 7 in off-line operation, preferably in coded form. For later identification upon use of the data support, the data supplied to the central storing location or recorded on the protocol track 7 are compared with the data read from the linear track 8. The random information within the linear track 8 are discrete values which are practically impossible to duplicate. In this manner, it will also be impossible to prepare a second data support having an identical sequence of discrete random information within the linear track 8. in comparison with any original data support.

Within the region of the track, the data support is provided with recesses 9, 10 which, in the embodiment shown, are formed as circular holes. Into these holes, correspondingly shaped insert members 11, 12 may be inserted. The insert members are provided with patterns on their surfaces. The insert members are for example mounted on a base plate not shown and project from the base surface formed by the base plate to an amount corresponding to the thickness of the data support. The insert members may be rotated on the base plate about their central axes and may be adjusted by the user in reproducible manner, e.g., by markings provided on the base plate and on the insert members. In case of use, the data support is put on the base plate in such a manner that the top surfaces of the insert members and the data support are aligned in a plant. Characterization of the track 8 is then performed in view of the individual characterization made by the user by previous adjustment by means of the insert members 11, 12. Preferably, the recesses 9, 10 are arranged symmetrically with respect to the central track 8, so that the track to be detected from the insert members will always correspond with the track 8 to achieve the same degree of precision.

FIG. 2 shows a station 13 into which the data support is introduced and read or encoded for characterization and/or identification. The station 13 has a supporting frame 14 for receiving the data support, the frame being e.g. mounted on a base frame 15 in stationary manner. As best seen in FIG. 3, the supporting frame has smaller lateral dimensions than the data support 1, so that both lateral edges 3, 4 of the data support will laterally project from the supporting frame.

The station 13 is provided with a system 16 for aligning the data support. This system comprises two lateral walls 19, 20 which may be reciprocated within the base plane of the supporting frame 14 in a direction of arrows 17, 18 and which are aligned normally with respect to the moving direction. On their upper front ends, the lateral walls are pivoted at 21, 22 to one end of scissors-type arms 23, 24; 25, 26, respectively. The scissors-type arms 23, 24 and 25, 26 are pivotably connected at their opposite ends with stationary bearing bases 28, 29 through a joint 26, 27, respectively. On the lower ends of the front sides, the lateral walls 19, 20 are connected to third level or scissorstype arms 78, 79 through corresponding joints 30, 31 respectively. The front and rear third scissors-type arms 78, 79 are pivotable connected on their respectively opposite end through a joint 80, to a supporting base 81 connected with the frame. Further, on the bottom ends of the front sides, the later walls 19, 20 are connected through corresponding joints 30, 31 with second scissors-type arms 32, 33 and 34, respectively. The lower pair of scissors-type arms 32, 33, 34 engaging on the front and rear faces are pivotable supported on their ends opposite to the joints, by a pivot 35 lying on a common rotating axis. The scissors-type arms are of equal length. The first and third scissors-type arms and the lateral walls together form a structure similar to a parallelogram. Each parallelogram extends perpendicularly to the base plane of the supporting frame 14. The joints 26′, 80 and 27 are lying on a straight line extending perpendicularly to the base plane and extending through the track to be read. The pivots may be reciprocated up and down within a guiding slot 36, 36′. The guiding slot is aligned with a line 37 extending perpendicularly to the base plane of the supporting frame 14 and through the rotating centers of joints 26, 27.

An actuating shaft 38 mounted at its opposite ends in the base frame 15 engages the lower scissors-type pairs 32, 33 and 34, 34′, respectively, through a pair of tensioning springs 39, 40. By rotating the actuating shaft in the sense of arrow 41, as seen in FIGS. 2 and 3, the pivots 35, 35′ are moved downwardly within the guiding slots 36, 36′. Further, pressure springs 42 are provided which have a top supporting location on the joints 26, 27 and engage under supporting locations 43, 44 on the scissors-type arm to bias the scissors-type arms into an opened starting position shown n FIGS. 2 and 3.

A pressure plate 45 movable perpendicularly with respect to the base plane of the supporting frame 14 is provided thereabove.

The supporting frame has pins 48, 49, 50 on its two edges 46, 47 facing the lateral walls 19, 20 near the front and rear ends of the data support and in spaced relationship. These pins are biassed by springs 51, 51′ into a projecting position over the edges, as shown. In the pressure plate 45, on each side and substantially centrally between the respective pins 48, 49, pins 52, 53 are provided which are biassed by pressure spring 54 downwardly in such a maner that they project from the pressure plate towards the edges 46, 47, as shown.

Below the supporting frame 14, a sledge 56 of a data detection system is provided, said sledge being e.g. driven by a spindle 55 and comprising a sensor 57, the arrangement being such that the sensor mounted thereon will move on a path parallel to the base surface of the supporting frame 14 and simultaneously perpendicularly with respect to the moving direction of the lateral walls 19, 20 and extending through the line 37.

In operation, the date support 1, eventually together with a base frame supporting insert members 11, 12, will first be pulled by a conventional engagement system into the station and between the supporting frame and the pressure plate, or is pushed thereinto from outside. In case of rigid data supports, upon inserting the same, the spring force of springs 51, 54 is overcome to push the pins into the edges of the supporting frame or the pressure plate at least partially, so that the data support may pass. As soon as a sensor 58 determines that the data support has reached a predetermined position in longitudinal direction over the supporting frame 14, i.e. is sufficiently pulled in or inserted, the sensor provides a signal to a control device 59 causing a rotation of the actuating shafte 38 in the direction of arrow 41.

By this, the pivots 35 are moved downwardly in the front and rear guiding slots 36, 36', and thus the side walls 19, 20 are moved in the direction of arrows, 17, 18 towards the data support 1 until they contact the lateral edges 3, 4 of the data support 1. On the one hand, they will align the data support 1 on its lateral edges 3, 4 parallel to the side walls 19, 20 which are similar to clamping jaws, and simultaneously they align the linear track 8 of the data support 1 centrally in such a manner that it lies perpendicularly to the moving direction of the side walls 19, 20 and extends through the line 37. The force of the tensioning springs 39, 40 is selected in such a manner that, although the data support may be aligned on its lateral edges with respect to the side walls 19, 20, any damaging of the data support will be prevented. As soon as the alignment operation is finished, the pressure plate 45 is moved towards the supporting frame by the control device 59, whereby the data support 1 is pushed on the supporting frame and thus into the plane coincident with the base surface of the supporting frame. This will ensure that the linear track 8 will extend perpendicularly with repect to the moving direction of the side walls 19, 20 and in the base surface of the supporting frame 14, crossing line 37.

This will ensure that the sensor 57 of the data detection system will exactly detect the linear path 8, irrespective of modifications of the dimensions of the data support, and in simple manner In case the data suport is not formed of a rigid material, as in the case with the above disclosed embodiment, but rather of thin cardboard or paper, the force of the pressure springs 51, 54 will not be overcome and the data support will rather be deformed in the manner seen in FIGS. 2 and 4 by pushing its terminal zones upwardly by the pins 48, 49 and 50 and pushing the intermediate zone downwardly by the pins 52, 53, in such a manner that its lateral edges 3, 4 are formed in waved configuration. This will stabilize the data support upon alignment of the same by the above disclosed mechanism by means of the side walls 19, 20, to prevent deforming or damaging thereof and to allow an appropriate alignment without damaging the data support. When the pressure plate 45 is subsequently pushed down, the pins 48, 49, 50 and 52, 53 are moved back against the force of the respective pressure springs, so that the pressure plate will push the data support having a waved configuration as above disclosed, against the supporting frame 14 and thus into the base plane thereof. Characterizing and/or identification are then performed in the same manner as above disclosed.

In the above dislosed embodiment, the pins 48, 49, 50, 52 and 53 are always biassed into the positions mentioned above, so that any less rigid paper will always be waved upon pulling-in, in the manner disclosed above. However, the pins may also be supported in such a manner that they are in their retracted positions when the data support is introduced, and only upon indication of the introduced state of the data support, the control 59 will activate an appropriate device into the advance positions shown in FIGS. 2 and 3, thus deforming the data support to a configuration with waved cross-section.

In the above embodiment, the data support 1 has two parallel opposed lateral edges 3, 4. However, this is not essential. The mechanism may provide the alignment with data supports of other forms. The only condition is that one of the sides has at least one edge with two engagement locations for a lateral clamping device, and that the opposed side has at least one such location for engagement by a clamping device. In an embodiment for data support having irregular edges, the side walls 19, 20 provided as the clamping members are preferably not formed as continuous surfaces, but rather as interrupted surfaces.

In the above embodiment, the device has a mechanism of parallelogram type. As the above description shows, the centering operation may be performed by any mechanism constructed in such a manner that it has two engagement members arranged on both sides of the data support to be aligned, such engagement members being forced to be guided in such a manner that they will simultaneously reciprocate towards the data support lying therebetween and away therefrom, to define a centre line therebetween in unique manner and coincident with the path of the sensor of the data detection system.

Figure 5:
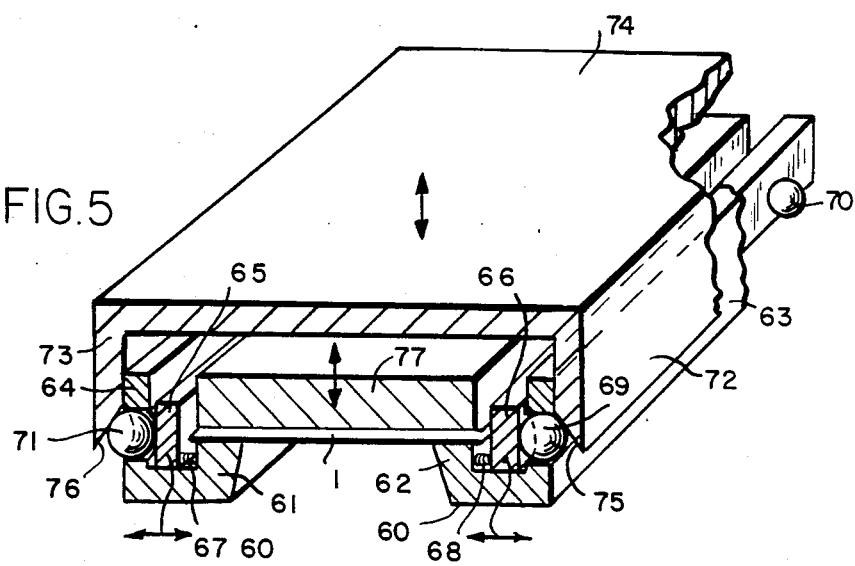
FIG. 5 is a perspective view of a further embodiment in partially broken-away representation.

FIG. 5 shows another embodiment. This has a base portion 60. The base portion is U-shaped on its two transverse sides, as seen in FIG. 5. The inner leg 61, 62 forms the supporting surface of the data support 1. On each side, between the innermost leg 61, 62 and the respective outer leg 63, 64, a clamping rail 65, 66 is provided, the clamping rails being biassed outwardly against the outer legs by pressure springs 67, 68 arranged between the inner leg and the clamping rail.

Each outer leg 63, 64 has at least two spheres pressure members 69, 70 and 71 of spherical shape. The speres are arranged within bores of the outer leg and have a larger diameter than the width of the outer leg. On the outside of the outer leg and substantially resting thereon, side walls 72, 73 are provided which are movable upwardly and downwardly with respect to the outer legs and which are interconnected by a transverse member 74. The side walls 72, 73 have bevelled end surfaces 75, 76 on their lower ends opposite the pressure members. Between the data support supporting surface of the data support formed by the inner legs and the upper transverse portion, another pressure plate 77 is arranged which may be reciprocated vertically to the supporting surface. A recess is provided below the supporting surface and between the two innermost legs, so that the data support may be read from the bottom side when resting thereon. In the center of the channel formed by the two innermost legs, just as with the first embodiment, a sensor 57 of a data detection system is movable on the center line between the two legs with respect to the base portion in reciprocating manner, for characterization and/or identification of the data support.

In operation, with this embodiment, the transverse portion 74 with its outer side walls 72, 73 is sufficiently moved upwardly that the clamping rails 65, 66 will be moved toward the outer legs by the springs 67, 68. The pressure plate 77 is lifted from the supporting surface. Then, the data support 1 is introduced into the station or pulled thereinto in usual manner. When it has reached its end position, this will be indicated by a sensor not shown, just as with the first embodiment. Subsequently, the transverse portion with its side walls is lowered towards the base portion. The bevelled end surfaces 75, 76 will thereby engage the balls and urge these inwardly against the clamping rails 65, 66 so that the clamping rails will be pushed against the lateral edges 3, 4 of the data support, parallel to the supporting surface. This will align the data support irrespective of its actual outer dimensions with respect to the inner legs laterally in such a manner that the centre line of the data support will be coincident with the centre line between the inner legs. During the succeeding operation, the pressure plate will be lowered onto the data support so that it will completely lie in the plane formed by the supporting surface of the inner legs. Subsequently, characterization and/or identification will be performed just as with the first disclosed embodiment. Finally, the pressure plate and the transverse portion 74 with the lateral walls 72, 73 will be raised, so that the data support may be withdrawn from the station. Relative movement of the lateral walls 72, 73 with respect to the base portion may be performed through a conventional drive.

In both embodiments, modifications of the dimensions of any parts of the devices, for example due to thermal effects, will always act on a centre line of the apparatus in symmetrical manner, so that the data support will always be aligned for processing to have its centre line coincident with the centre line of the apparatus, irrespective of any variations of the dimensions of the data support, and a sensor detecting along the centre line of the apparatus will always detect the data of the linear track exactly centrally of the data support.

The invention allows to position any data support perfectly aligned with its center line in various data processing stations. This is important, particularly in case the data support is to be used as an identity card or credit card with various terminals of different manufacturers and having eventually different manufacturing tolerance limits.

It should be understood that the above description is in no way limitative to the disclosed embodiments and covers any modification or improvement lying within the true spirit of the invention.

What is claimed is:

1. A device for identifying a data support, comprising:
    means for engaging said data support;
    means for moving an engaged data support into an automatic processing system including a detection system for detecting information on said data support along a linear detection path; and
    aligning means for aligning said data support in a detection position to bring said linear detection path into coincidence with a central track between two opposed edges of the data support, including
    a first alignment member engaging a first edge of said opposed edges of said data support and a second alignment member engaging a second edge of said opposed edges of said data support, said first and second alignment members being disposed on opposite sides of said linear detection track and being reciprocally movable in an operating direction parallel to the plane of the data support transversely to said linear detection path,
    and driving means for moving said first alignment member in said operating direction towards said linear detection path and simultaneously moving said second alignment member in a direction opposite to said operating direction of said first alignment member towards said linear detection track while keeping both alignment members symmetrically disposed on opposite sides of said linear detection tracks.

2. The device of claim 1 wherein said aligning means comprise deforming members for momentarily deforming a generally flat data support into a shape having a generally non-flat cross section.

3. The device of claim 2 wherein control means are provided for controlling said deforming members to be operative prior to alignment by said aligning means and, during alignment, a pressure plate being provided for holding said data support against a supporting frame when said data support is in an aligned deformed state.

4. The device of claim 1 wherein said detection system is movable parallel to said linear detection path on an aligned data support.

* * * * *